(12) United States Patent
Krieg et al.

(10) Patent No.: US 6,779,912 B2
(45) Date of Patent: Aug. 24, 2004

(54) HEADLIGHT, ESPECIALLY FOR A MOTOR VEHICLE, AND METHOD FOR ADJUSTING LIGHT RADIATED BY THE HEADLIGHT

(75) Inventors: Wolfgang Krieg, Reutlinger (DE); Hans-Joachim Schmidt, Dusslingen (DE); Harry Hofmann, Sindelfingen (DE)

(73) Assignee: Automotive Lighting Reutlingen GmbH, Reutlingen (DE)

( * ) Notice: Subject to any disclaimer, the term of this patent is extended or adjusted under 35 U.S.C. 154(b) by 0 days.

(21) Appl. No.: 10/191,194

(22) Filed: Jul. 9, 2002

(65) Prior Publication Data
US 2003/0012028 A1 Jan. 16, 2003

(30) Foreign Application Priority Data
Jul. 12, 2001 (DE) .......................................... 101 33 864

(51) Int. Cl.⁷ ............................................... F21V 17/02
(52) U.S. Cl. ........................ 362/460; 362/514; 362/515; 362/524; 362/516
(58) Field of Search ................................. 362/516, 517, 362/518, 514, 515, 524, 512, 281, 283, 284, 527

(56) References Cited
U.S. PATENT DOCUMENTS
6,447,153 B1 * 9/2002 Kawamura ................... 362/507
6,478,460 B2 * 11/2002 Furuya et al. ............... 362/514
6,540,386 B2 * 4/2003 Fujino et al. ................ 362/525

FOREIGN PATENT DOCUMENTS
FR 2 424 157 4/1978

* cited by examiner

Primary Examiner—Stephen Husan
Assistant Examiner—Anabel Ton
(74) Attorney, Agent, or Firm—Michael J. Striker

(57) ABSTRACT

The headlight, especially for a motor vehicle, includes at least two separately adjustable reflectors and a reflector height adjusting mechanism for adjusting the reflector heights separately or synchronously. The reflectors include a first reflector for high beam light and/or fog light and a second reflector associated with a low beam light module. The reflector height adjusting device includes separate adjusting devices for individually adjusting the respective heights for the at least two separately adjustable reflectors and a coupling member for the separate adjusting devices. When the separate adjusting devices are put in a coupled state by the coupling member the heights of the at least two reflectors are synchronously adjusted by operation of only one of the separate adjusting devices. The method for adjusting light radiated from the headlight includes performing a pre-adjustment in which each of the reflectors is separately adjusted by the separate adjusting devices. The coupling member couples the separate adjusting devices and the reflectors are then synchronously adjusted by operation of only one adjusting device.

10 Claims, 3 Drawing Sheets

HEADLIGHT, ESPECIALLY FOR A MOTOR VEHICLE, AND METHOD FOR ADJUSTING LIGHT RADIATED BY THE HEADLIGHT

BACKGROUND OF THE INVENTION

The present invention relates to a headlight, especially for a motor vehicle, comprising a low beam light module and at least two separately adjustable reflectors for high beam light and/or fog light and the low beam light. A first reflector is for the high beam light and/or fog light and the second reflector is for the low beam light. The reflectors have separate adjusting means for individual adjustment of their heights separately from each other.

This sort of headlight is known. The height or elevation adjustment generally occurs in headlights with two separate reflectors by means of two height adjusting means. Each adjustment means is associated with a respective reflector. The height adjustment of both reflectors occurs separately and independently of each other.

Height or elevation adjustment in this way is disadvantageously laborious. It is comparatively difficult to synchronize both headlights.

SUMMARY OF THE INVENTION

It is an object of the present invention to provide a headlight, in which an adjustment of the respective heights of two separately adjustable reflectors can be performed in a simple and an easy manner.

According to the invention the headlight comprises at least two separately adjustable reflectors, separate means for individually adjusting the respective heights of the at least two reflectors and a coupling member for coupling the separate means for individually adjusting the reflector heights, so that, when only one of the separate means for individually adjusting the reflector heights is operated and the separate means for individually adjusting are in a coupled stated coupled by the coupling member, the respective heights of the at least two reflectors are adjusted at the same time by its operation.

Thus both of the reflectors can be synchronously adjusted by a single adjusting means when both reflector systems are coupled with each other by means of the coupling member. This provides the great advantage that both reflectors can be put in their correct positions in a simple manner. Furthermore the control of both reflectors is clearly simplified, when the height adjustment is only performed with a single adjusting means. Furthermore one of the adjusting means that is already present in the prior art adjusting mechanism acts as that adjusting means.

However both reflectors can be individually adjusted by means of their respective adjusting means when they are in an uncoupled state, i.e. not coupled by the coupling member. In this way, for example, a pre-adjustment of both reflectors, namely the reflector, which produces high beam light and/or fog light, and the reflector, which produces low beam light, can be performed separately. Both reflectors can thus be put in a suitable basic configuration or can be aligned in a suitable position relative to each other. Then the separate adjusting means can be coupled with each other by the coupling member. Then synchronized positioning of both reflectors can occur by adjustment of a single adjusting element.

Adjusting screws, especially equipped with exterior gear teeth, can be used as the adjusting means for the reflectors.

In preferred embodiments adjusting means comprise adjusting screws provided with exterior conical gear teeth, which cooperate with a coupling member formed by a cone gear. The cone gear similarly has exterior gear teeth. The exterior gear teeth of the adjusting screws correspond and mesh with gear teeth of the twin cone gear acting as the coupling member. The bevel or slope of the gear teeth can be selected differently, in order to guarantee different guidance. In a particularly preferred embodiment one gear pair has cylindrical gear teeth, while the other gear pair has conical gear teeth.

In preferred embodiments at least one of the adjusting screws or elements is engageable or disengageable with the coupling member, for example by translation of the adjusting screw. Thus at least one of the adjusting screws can have an interior passage, by means of which it is slidable on an adjusting spindle in an axial direction or in the axial direction for height adjustment. The outer gear teeth of the adjusting screw and the outer gear teeth of the cone gear can be brought into and out of engagement with each other by this sliding motion. Thus coupling and decoupling of the means for separately adjusting the respective heights of the reflectors can be easily performed in a simple manner. The adjusting means is however usually connected nonrotatably with the spindle in order to provide rotational synchronization.

Especially the adjusting means for the height of the high beam light and/or fog light reflector can be continuously coupled with the coupling member, while the adjusting means for the low beam light module can be movable or shiftable in and out of engagement with the coupling member. Alternatively the adjustment means for the low beam light module can be continuously in engagement with the coupling member and the adjusting means for the high beam/fog light can be engageable and disengageable with the coupling member.

The coupling and decoupling can be provided in this way in a particularly simple manner, since only one of the adjusting means must be moved or shifted in an axial direction. Alternatively however both adjusting means can be engageable and disengageable with the coupling member.

Thus in the coupled state both reflectors or all reflectors can be adjusted or moved, synchronized with each other, by operation of the adjusting means for the low beam light module.

The transmission of adjusting force occurs by means of an adjusting spindle, by which the height adjustment mechanism is coupled to a gear unit or device, which then controls and moves both reflectors. The various axial spacing of both reflectors can be varied and compensated by means of the gear device.

The light module for the low beam light can be a PES (poly-ellipsoid system) light module, namely a projection module, which includes a projection arrangement, a reflector arrangement and a light source.

Finally the present invention also includes a method of adjusting the light radiated from the headlight with one or more of the foregoing features. The pre-adjustment of the reflectors occurs by adjusting each of the reflectors individually with respect to the others. Then subsequently the adjusting means for separately or individually adjusting the reflectors are coupled to each other by means of a coupling member. The reflectors are then synchronously adjusted by adjusting only one of the adjusting members.

BRIEF DESCRIPTION OF THE DRAWING

The objects, features and advantages of the invention will now be described in more detail with the aid of the following description of the preferred embodiments, with reference to the accompanying figures in which.

DETAILED DESCRIPTION OF THE INVENTION

Figure 1:
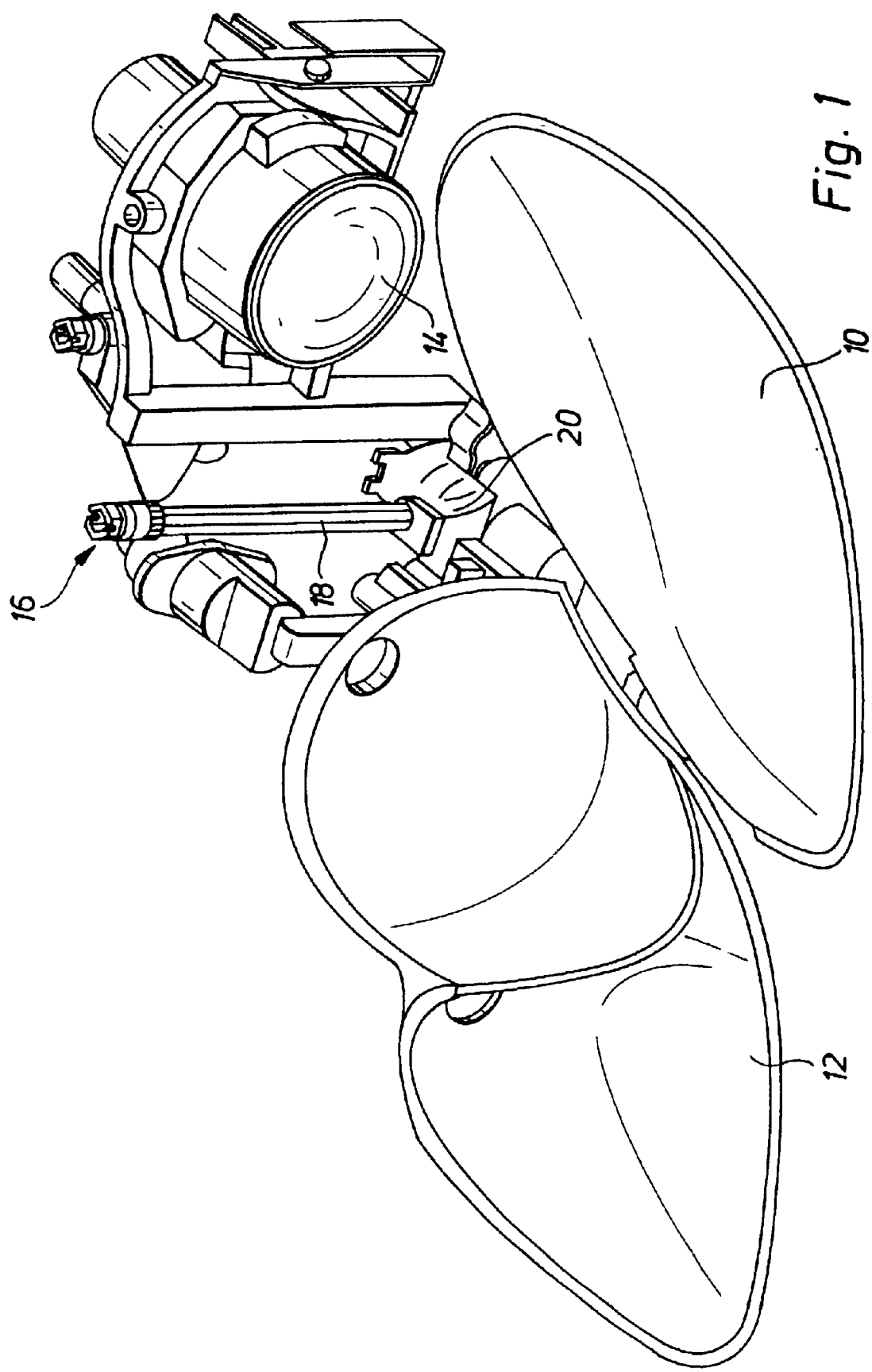
FIG. 1 is a perspective view of parts of a headlight according to the invention, including the reflector height adjustment device according to the invention.

FIG. 1 is an illustration showing parts of a headlight according to the invention. The headlight includes a first reflector 10 and a second reflector 12. The first reflector 10 is associated with a low beam light module 14 and a second reflector arrangement 12 for high beam light and/or fog light.

Figure 2:
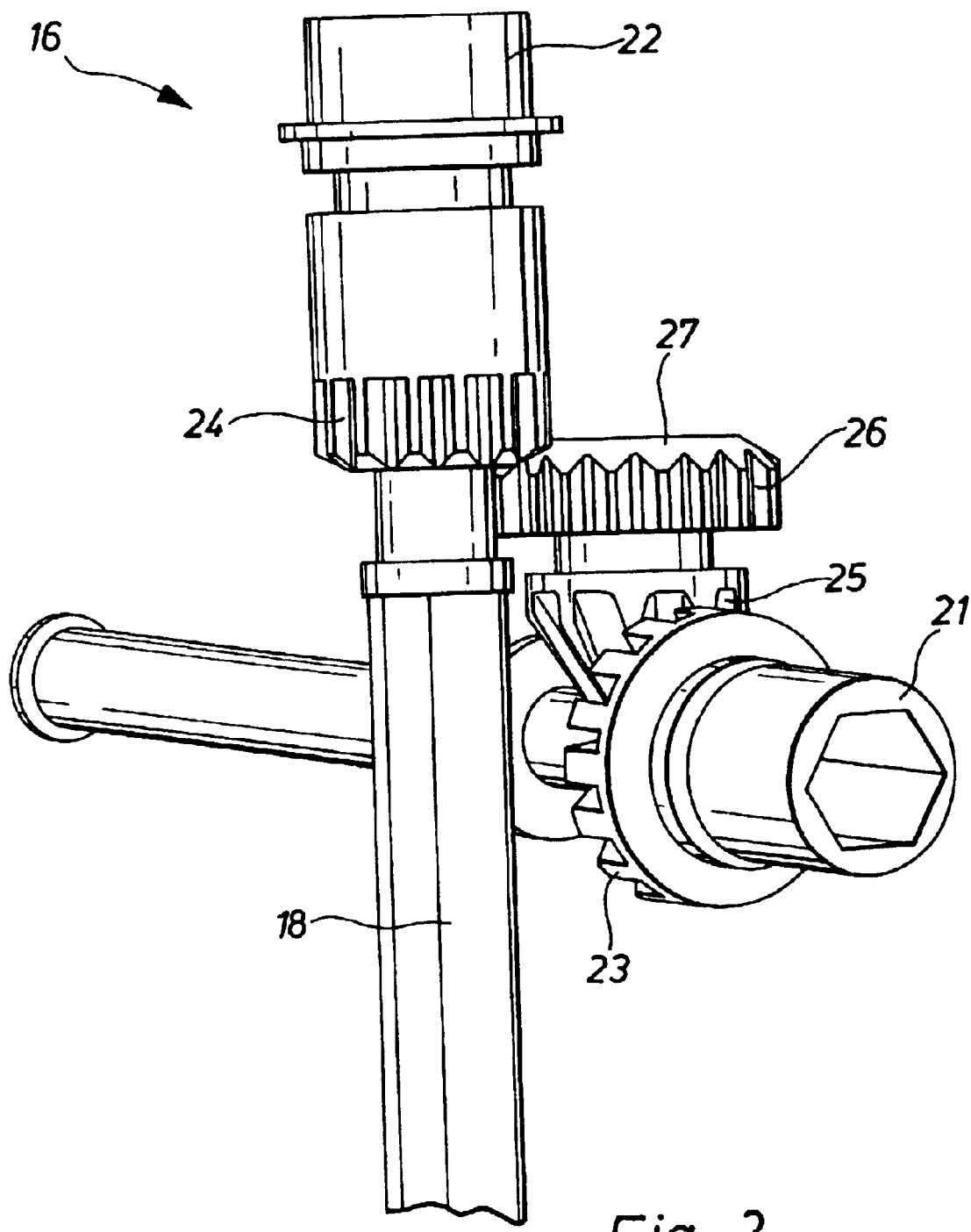
FIG. 2 is a cutaway perspective view of essential parts of the headlight adjustment mechanism for the headlight according to the invention, showing the separate means for individually adjusting the respective heights of the reflectors uncoupled from each other during a pre-adjustment.
Figure 3:
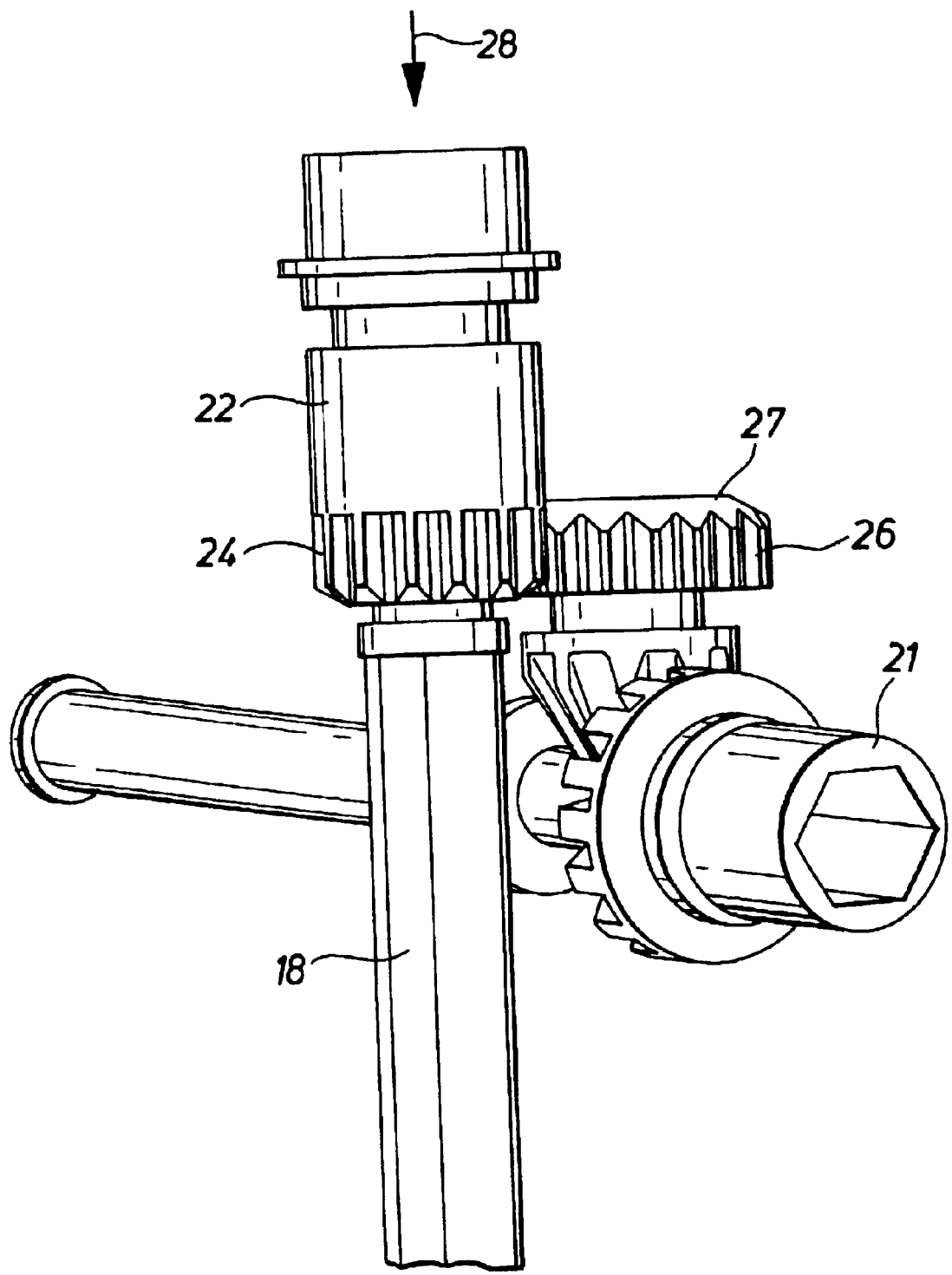
FIG. 3 is a cutaway perspective view of essential parts of the headlight adjustment mechanism, similar to FIG. 2, but with the separate means for individually adjusting the respective heights of the reflectors coupled with each other during a synchronous adjustment of their heights.

The height adjustment of the reflectors 10, 12 takes place by means of a reflector height adjustment device 16. The structure of this height adjustment device 16 is illustrated in FIGS. 2 and 3. An adjusting spindle 18 of the height adjusting device transmits the height adjustment to a gear device 20. The gear device 20 compensates for the different axial spacing of the reflectors 10 and 12 by means of the gear ratios of the gear device.

The height adjusting device 16 is illustrated in detail in FIG. 2. The reflector height adjusting device 16 includes a first adjusting screw 21, which adjusts the height of the high beam light/fog light reflector 12. The height adjusting device 16 also includes a second adjusting screw 22, which is responsible for the height adjustment of the low beam light. Both adjusting screws 21 and 22 are equipped with exterior gear teeth 23 and/or 24. The exterior gear teeth 23,24 cooperate with corresponding exterior gear teeth 25,26 of a coupling member 27, which is a conical gear or bevel gear.

The outer gear teeth 23 of the adjusting screw 21 are conical and engage with the outer gear teeth 25 of the coupling member.

For adjustment of each reflector arrangement 10, 12 separately the height adjusting device 16 is put in the configuration shown in FIG. 2. The adjusting screw 22 is arranged with its exterior gear teeth 24 out of engagement with the outer gear teeth 26 of the cone gear 27. The adjusting screw 22 is axially slidable on the adjusting spindle 18 for this purpose. By sliding the adjusting screw 22 in the axial direction the gear teeth 24 of the adjusting screw can be engaged with the coupling member 27. The adjusting screw 21 is always in engagement with the coupling member 27.

If the both reflectors 10 and 12 are to be coupled for simultaneous adjustment, the adjusting screw 22 is pushed in an axial direction 28, as shown by the arrow in FIG. 3, until their exterior gear teeth 24 are engaged with the coupling member 27 and the gear teeth 26 on it. The adjusting screw 22 is pressed downward and in a direction toward the coupling member 27.

Then a joint adjusting of the height of both reflectors 10 and 12 can occur by means of the single adjusting screw 22.

The operation of the adjusting screw 21 is not required when the gear teeth 24 are couple with the coupling member 27. The height adjustment is directly transmitted to the gear device 20 by the adjusting spindle 18 by operation of the adjusting screw 22. In this way an especially simple synchronous height adjustment of two or more separately movable reflectors 10, 12 can be guaranteed.

By definition the "separate means for individually adjusting" the height of the reflector 12 for high beam light and/or fog light includes the adjusting screw 21. The "separate means for individually adjusting" the height of the reflector 10 associated with the low beam light module 14 comprises the adjusting screw 22.

The disclosure in German Patent Application 101 33 864.3-33 of Jul. 12, 2001 is incorporated here by reference. This German Patent Application describes the invention described hereinabove and claimed in the claims appended hereinbelow and provides the basis for a claim of priority for the instant invention under 35 U.S.C. 119.

While the invention has been illustrated and described as embodied in a headlight, especially for a motor vehicle, and method for adjusting the light distribution from the headlight, it is not intended to be limited to the details shown, since various modifications and changes may be made without departing in any way from the spirit of the present invention.

Without further analysis, the foregoing will so fully reveal the gist of the present invention that others can, by applying current knowledge, readily adapt it for various applications without omitting features that, from the standpoint of prior art, fairly constitute essential characteristics of the generic or specific aspects of this invention.

What is claimed is new and is set forth in the following appended claims.

We claim:

1. A headlight comprising
a low beam light module (14);
at least two separately adjustable reflectors (10,12) including a first reflector and a second reflector, said first reflector comprising means for reflecting at least one of high beam light and fog light and said second reflector being associated with the low beam light module (14); and
a reflector height adjusting device (16) including separate means (21,22) for individually adjusting respective heights of said at least two separately adjustable reflectors and a coupling member (27) for coupling the separate means for individually adjusting said respective heights of said at least two separately adjustable reflectors, wherein said separate means (21,22) have a coupled state in which said separate means (21,22) are coupled by the coupling member and all of said reflectors are synchronously adjusted by operation of only one of said separate means (21,22); and
wherein said separate means (21,22) have an uncoupled state in which said at least two separately adjustable reflectors are separately adjusted by operation of each of said separate means individually.

2. The headlight as defined in claim 1, wherein said one of said separate means for individually adjusting is moveable or shiftable so that said separate means for individually adjusting are put into said uncoupled state.

3. The headlight as defined in claim 1, wherein said separate means (21,22) for individually adjusting comprise separate adjusting screws with respective exterior gear teeth (23,24) and said coupling member (27) has corresponding exterior gear teeth (26,26) meshing with said exterior gear teeth (23,24) of the adjusting screws in said coupled state.

4. The headlight as defined in claim 1, wherein said separate means (21,22) are put out of said coupled state and into said uncoupled state by a translation motion of one of said separate means for individually adjusting the at least two separately adjustable reflectors.

5. The headlight as defined in claim 1, wherein said one of said separate means individually adjusts said second reflector associated with said low beam light module and is disengagable from said coupling member and another of said separate means individually adjusts said first reflector is continuously in engagement with said coupling member (27).

6. The headlight as defined in claim 5, wherein said reflector height adjusting device (16) is operable by operation of said one of said separate means for individually adjusting said second reflector associated with said low beam light module when said separate means for individually adjusting are in the coupled state.

7. The headlight as defined in claim 6, wherein said reflector height adjusting device (16) compensates for differing axial positions of said at least two reflectors (10,12) by means of a gear device (20).

8. The headlight as defined in claim 1, wherein said low beam light module (14) comprises a poly-ellipsoid system light module.

9. The headlight as defined in claim 1, consisting of a motor vehicle headlight.

10. A method of adjusting light from a headlight comprising a low beam light module (14), at least two separately adjustable reflectors (10,12) and separate means (21,22) for individually adjusting respective heights of said at least two separately adjustable reflectors and a coupling member (27) for coupling the separate means for individually adjusting said respective heights of said at least two separately adjustable reflectors, said separate means (21,22) having an uncoupled state n which said at least two separately adjustable reflectors are separately adjusted by operation of each of said separate means individually and a coupled state in which said separate means (21,22) are coupled by the coupling member (27) and all of said reflectors are synchronously adjusted by operation of only one of said separate means (21,22); said method comprising the steps of:

a) performing a pre-adjustment of said at least two reflectors by adjusting respective ones of said separate means (21,22) individually when said separate means are in an uncoupled state;

b) after the pre-adjustment of step a), coupling said separate means (21,22) with each other with the coupling member (27); and then c) adjusting the respective heights of said at least two reflectors synchronously by operation of said one of said separate means.

\* \* \* \* \*